United States Patent
Iwai

(10) Patent No.: US 7,418,954 B2
(45) Date of Patent: Sep. 2, 2008

(54) GASEOUS FUEL AND AIR MIXER FOR AN ENGINE

(75) Inventor: Yoshiro Iwai, Kobe (JP)

(73) Assignee: Iwai Trading Co., Ltd., Kobe-Shi, Hyogo-Ken (JP)

( * ) Notice: Subject to any disclaimer, the term of this patent is extended or adjusted under 35 U.S.C. 154(b) by 0 days.

(21) Appl. No.: 11/612,097

(22) Filed: Dec. 18, 2006

(65) Prior Publication Data
US 2007/0137623 A1 Jun. 21, 2007

(30) Foreign Application Priority Data
Dec. 20, 2005 (JP) .............................. 2005-366266
Jul. 10, 2006 (JP) .............................. 2006-189117

(51) Int. Cl.
*F02B 43/00* (2006.01)
(52) U.S. Cl. .................................. 123/527; 123/27 GE
(58) Field of Classification Search ............ 123/27 GE, 123/527; 48/189.6
See application file for complete search history.

(56) References Cited

U.S. PATENT DOCUMENTS

| | | | | |
|---|---|---|---|---|
| 2,035,538 A | * | 3/1936 | Dean et al. | ................ 48/189.6 |
| 4,003,345 A | * | 1/1977 | Bradley | ....................... 123/3 |
| 4,033,308 A | * | 7/1977 | Hayashi et al. | ........ 123/568.29 |
| 4,116,183 A | * | 9/1978 | Hayward | ..................... 123/549 |
| 5,596,969 A | | 1/1997 | Lipinski | |
| 2002/0148451 A1 | | 10/2002 | Yamamoto | |

FOREIGN PATENT DOCUMENTS

| | | |
|---|---|---|
| AU | 83132/75 | 1/1977 |
| GB | 2113309 A | 8/1983 |
| JP | 2002081346 | 3/2006 |
| WO | WO0242621 A1 | 5/2002 |

* cited by examiner

*Primary Examiner*—Noah Kamen
(74) *Attorney, Agent, or Firm*—Duane Morris, LLP

(57) ABSTRACT

A path (24) is formed in an intake tube (6), which supplies external air to a reciprocating engine (4). External air flowing from an inlet port to an outlet port of the path (24). A gaseous fuel path (26) is connected to the path (24) at an intermediate location thereof. A gaseous fuel, lighter than air, is supplied through the gaseous fuel path (26) into the path (24). A plurality of nets (8) are disposed in an area of the path (24) between the outlet port and the gaseous fuel path (26). The nets (28) are spaced along the length of the path (24) with the outer peripheral surface of each net (28) being in contact with the inner surface of the path (24).

8 Claims, 3 Drawing Sheets

GASEOUS FUEL AND AIR MIXER FOR AN ENGINE

This invention relates to a mixer for mixing a gas with air and supplying the mixture to an engine having a piston.

BACKGROUND OF THE INVENTION

In an engine which generate power by burning a gaseous fuel, e.g. Hydrogen gas, the gaseous fuel is mixed with air before being supplied to the engine. It is necessary to mix the hydrogen gas with air with a high efficiency, and, a technique to realize it is disclosed in, for example, JP 2002-81346 A. According to the technique disclosed in this Japanese patent publication, interior paths and exterior paths are circumferentially formed in an air turbo ram engine. The interior and exterior paths alternate with each other. Air compressed by a fan is blown through the respective exterior paths, and hydrogen gas is blown through the respective interior paths, whereby the air and hydrogen gas are mixed with each other. A guide vane is provided in order to forcibly direct the hydrogen gas in each interior path to flow outward, and thus the hydrogen gas flowing out in the outward direction can be mixed efficiently with the air, which is heavier in weight, blown outward from the exterior.

This arrangement, however, is for an air turbo ram engine, and, therefore, cannot be employed for engines provided with pistons, such as a reciprocating engines and rotary engines.

An object of the present invention is to provide a mixer which can mix air with a gas having a different specific gravity from air with high efficiency, and also an engine system with such mixer.

SUMMARY OF THE INVENTION

According to an embodiment of the present invention, a mixer includes a path formed in an intake tube for supplying external air to an engine with a piston. The air flows from an inlet port to outlet port of the path. A gaseous fuel path is coupled to the path at an intermediate portion of the path for supplying a gaseous fuel to the path. The gaseous fuel may have a specific gravity different from that of external air and is supplied from a gaseous fuel source. The pressure of the gaseous fuel in the gaseous fuel source is desirably higher than the pressure of the external air in the gaseous fuel path. A first net is disposed in an area of the path between the location where the gaseous fuel path is coupled to the path and the outlet port of the path. The first net has its outer periphery contact with the inner peripheral surface of the path.

With the above-described arrangement, when an inlet valve of the engine is opened, the gaseous fuel, which inherently is hard to mix with air because of its different specific gravity than air, can be stirred and mixed well with air when they pass through the first net by virtue of what is called Kármán vortices in hydromechanics before being supplied to the engine. Like this, the gaseous fuel and air can be mixed well with a very simple arrangement.

A plurality of such first nets may be disposed, being spaced from each other. As the number of the first nets, through which the gaseous fuel and air pass, increases, the fuel and air can be mixed better.

A second net may be disposed between the location where the gaseous fuel path is coupled to the path and the inlet port of the path. It is known that when gas is combusted in a reciprocating engine, the engine tends to backfire. When the engine backfires and flames jet out into the path, the heat of the flames is absorbed by the first net disposed between the outlet port of the path at which the path is coupled to the engine and the location where the gaseous fuel path is connected to the path, so that the flames can be extinguished. In addition, the second net disposed between the inlet port of the path and the location where the gaseous fuel path is connected to the path can ensure that the flames can be extinguished so that the jetting out of the flames from the inlet port can be prevented.

A plurality of such second nets may be disposed, being spaced from each other. As the number of the second nets increases, the flames can be more reliably prevented from jetting out through the inlet port.

According to another embodiment, a path is formed in an intake tube as in the above-described first embodiment. A plurality of gaseous fuel paths are coupled to the path at locations spaced from each other along the length of the path. A net is disposed in an area of the path between the gaseous fuel path closest to the outlet port of the path and the outlet port. The outer peripheral surface of the net is in contact with the inner peripheral surface of the path. Gaseous fuels are supplied to the respective gaseous fuel paths. These gaseous fuels may be the same fuel or may be different from each other. Alternatively, one or more of the gaseous fuel paths may be supplied with a gaseous fuel(s), and other one or ones of the gaseous fuel paths may be supplied with a gasified liquid fuel(s). In this case, too, the same or different gaseous fuel(s) may be used, and the same or different gasified liquid fuel(s) may be used. As a further alternative, one or more of the gaseous fuel paths may be supplied with a gaseous fuel(s), with other one or more of the gaseous fuel paths supplied with a combustion promoting gas. In this case, too, the same or different gaseous fuel(s) can be used. As the combustion promoting gas, gasified water or the like can be used. As a still other alternative, one or more of the gaseous fuel path(s) may be supplied with the same or different gaseous fuel(s), with one or more of the gaseous fuel path(s) supplied with the same or different gasified liquid fuel(s), and with the remaining ones supplied with a combustion promoting gas.

With this arrangement, a gaseous fuel and/or a gasified liquid fuel, or a gaseous fuel, a gasified liquid fuel and a combustion promoting gas are stirred and mixed with external air while they pass through the nets, before they are supplied to the engine. In this way, the gaseous fuel and the gasified liquid fuel, or the gaseous fuel, the gasified liquid fuel and the combustion promoting gas can be mixed well with a simple arrangement. In addition, the net disposed between the outlet port of the path and the gaseous fuel path closest to the outlet port can extinguish flames of backfire.

A plurality of such nets may be used so that better mixing of the gaseous fuel and the gasified liquid fuel, or the gaseous fuel, the gasified liquid fuel and the combustion promoting gas can be realized.

A net may be disposed in an area of the path between the gaseous fuel path closest to the inlet port of the path and the inlet port. The outer peripheral surface of this net is also disposed in contact with the inner peripheral surface of the path. The net can prevent flames of backfire from jetting out of the inlet port of the path. A plurality of such nets may be used so that the jetting out of the flames can be more reliably prevented.

A net may be disposed between adjacent ones of the gaseous fuel paths. In this case, too, a plurality of such nets can be disposed between adjacent ones of the gaseous fuel paths.

With this arrangement, better mixing of the gaseous fuel and the gasified liquid fuel, or the gaseous fuel, the gasified liquid fuel and the combustion promoting gas can be realized.

In each of the above-described embodiments, a carburetor for gasifying a liquid fuel may be disposed in the intake tube, and it can be arranged that the carburetor and the mixer are selectively operated. With this arrangement, one engine can be selectively operated from a gaseous fuel, a liquid fuel and a mixture of the gaseous fuel and the liquid fuel.

BEST MODE FOR CARRYING OUT THE INVENTION

Figure 1:
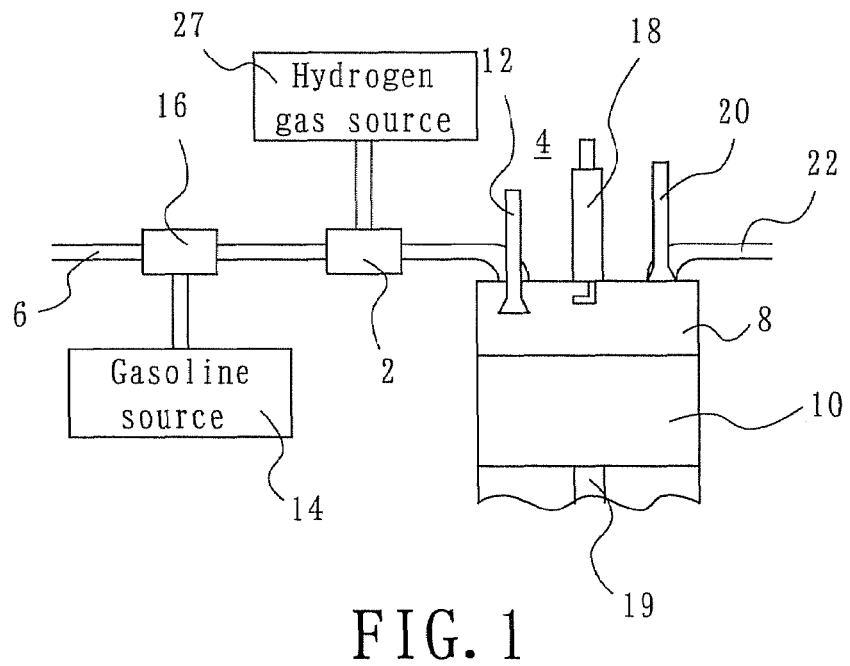
FIG. 1 shows a general arrangement of an engine with a mixer according to a first embodiment of the present invention.

A mixer 2 according to a first embodiment of the invention is disposed in an intermediate portion of an intake tube 6 for supplying air to, for example, a reciprocating engine 4, as shown in FIG. 1. The reciprocating engine 4 includes a piston in a cylinder 8. In the reciprocating engine 4, when the piston 10 goes down, an inlet valve 12 opens, and gasoline from a gasoline source 14 and air flowing through the intake tube 6 are mixed in a carburetor 16 disposed at an intermediate location of the intake tube 6. The mixture is then sucked into the cylinder 8, and the inlet valve is closed. Then, the piston 10 starts moving upward to compress the mixture gas, and, when the mixture gas is sufficiently compressed, an ignition plug 18 ignites the mixture gas to cause instantaneous combustion of the mixture gas. High pressure caused by the combustion drives down the piston 10 with strong force. This strong force makes a crank shaft (not shown) connected to the piston 10 by means of a connecting rod 10 rotate. In this manner, power is derived. After that, an exhaust valve 20 opens, and the piston 10 goes up to exhaust the cylinder 10 through an exhaust tube 22. This procedure is repeated.

Figure 2:
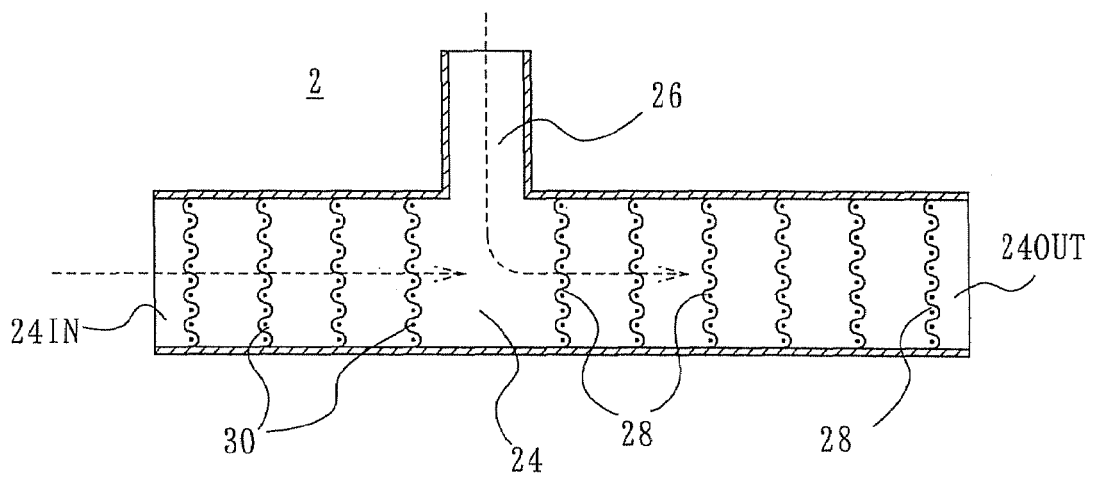
FIG. 2 shows a general construction of the mixer according to the first embodiment.

The mixer 2 is disposed in the intake tube 6 at a location between the carburetor 16 and the inlet valve 12 of the engine 4. As shown in FIG. 2, the mixer 2 has a path 24, which is, for example, tubular in shape. The tubular path 24 has its inlet port 24IN coupled to the carburetor 16 and has its outlet port 24OUT coupled to the inlet valve 12. A gaseous fuel path 26 also tubular in shape is coupled to the path 24 at an intermediate location on the path 24. The gaseous fuel path 26 is coupled to a gaseous fuel source, e.g. a hydrogen gas source 27, as shown in FIG. 1, which supplies hydrogen gas to the path 24 at a pressure of, for example, 0.01 MPa or higher. The mixture ratio of the hydrogen gas to the air in the intake tube 6 may be within a range between 1:99 and 6:94, desirably between 2:98 and 5:95, and most desirably, between 3:97 and 4:96. It is desirable to form the path 24 and the gaseous fuel path 26 as a single member, and the material for them is desirably a material having a small specific gravity and heat resistance, e.g. steel or copper.

A plurality of first nets 28 are spaced along the length of the path 24 in an area of the path 24 between the location where the gaseous fuel path 26 is coupled to the path 24 and the outlet port 24OUT. Each of the first nets 28 has its outer circumferential surface contacting the inner surface of the path 24 so that the meshes of the net 28 face the inlet and outlet ports 24IN and 24OUT. The mesh, which represents the size of the meshes, of the first nets 28 is from 10 to 300, for example. The nets 28 are made of a metal having heat-resistance and high thermal conductivity, or the like material.

Similarly, in an area of the path 24 between the location where the gas path 26 is coupled to the path 24 and the inlet port 24IN, a plurality of second nets 30 having the same configuration as the first net 28 are spaced along and attached to the path 24 in the same manner as the first nets 28.

When the mixer 2 with the above-described arrangement is operated from hydrogen gas, the supply of the mixture of gasoline and air from the carburetor 16 is stopped. This can be done by, for example, closing a first on-off valve (not shown) disposed between the carburetor 16 and the gasoline source 14. At the same time, a second on-off valve (not shown) disposed between the hydrogen source 27 and the mixer 2 is opened to allow hydrogen gas to be supplied to the mixer 2. Then, the engine 4 is started, opening the inlet valve 12, which causes the hydrogen gas to be let in into the path 24 from the gaseous fuel path 26 and also causes external air to be let in into the path 24 through the inlet port 24IN. As the air is passing through the second nets 30, foreign materials, such as dust, are removed, and the air advances through the first nets 28 to the outlet port 24OUT. Also, hydrogen gas from the gaseous fuel path 26 passes through the nets 28 toward the outlet port 24OUT. It should be noted that, without the nets 28, the hydrogen gas and the air cannot be mixed well because of difference in specific gravity between them. The presence of the nets 28 causes Kármán vortices to be produced in the hydrogen gas and air streams, so that the hydrogen gas and air are stirred and mixed well. The resultant gas mixture is taken into the engine 4.

It is known that, when hydrogen gas is used as a fuel for operating an engine, the engine tends to backfire. If the engine 4 backfires, flames from the inlet valve 12 of the engine 4 jet out through the path 24 from the outlet port 24OUT toward the inlet port 24IN. However, since the nets 28 and 30 are disposed in the path 24 to extend perpendicular to the length direction of the path 24, the flames contact the nets 28 and 30, and the flame temperature decreases, so that the flames are extinguished. In particular, the nets 30 disposed in the inlet port 24IN of the path 24 can prevent the flames from jetting out from the inlet port 24IN to reach the carburetor 16. It is desirable to dispose a plurality of fins around the outer surface of the path 24, which extend along the length of the path 24, to improve the heat dissipation.

For operating the engine 4, using gasoline as the fuel, the second on-off valve disposed between the hydrogen gas source 16 and the mixer 2 is closed, and the first on-off valve disposed between the carburetor 16 and the gasoline source 14 is opened. In this way, the engine 4 can be operated from desired one of hydrogen gas and gasoline. When gasoline is used as a fuel for the engine 4, the mixer 2 can function as a strainer by virtue of the presence of the nets 28 and 30. Further, by the use of flow control valves in place of the on-off valves disposed between the hydrogen gas source 27 and the mixer 2 and between the carburetor 16 and the gasoline source 14, respectively, a mixture gas consisting of hydrogen gas, gasoline and air can be supplied to the engine 4. In this case, the combustion of hydrogen gas promotes perfect combustion in the engine 4. One net 28 and one net 30 may be used in place of the plural nets 28 and 30. In some cases, the nets 30 may be eliminated, if necessary.

Figure 3:
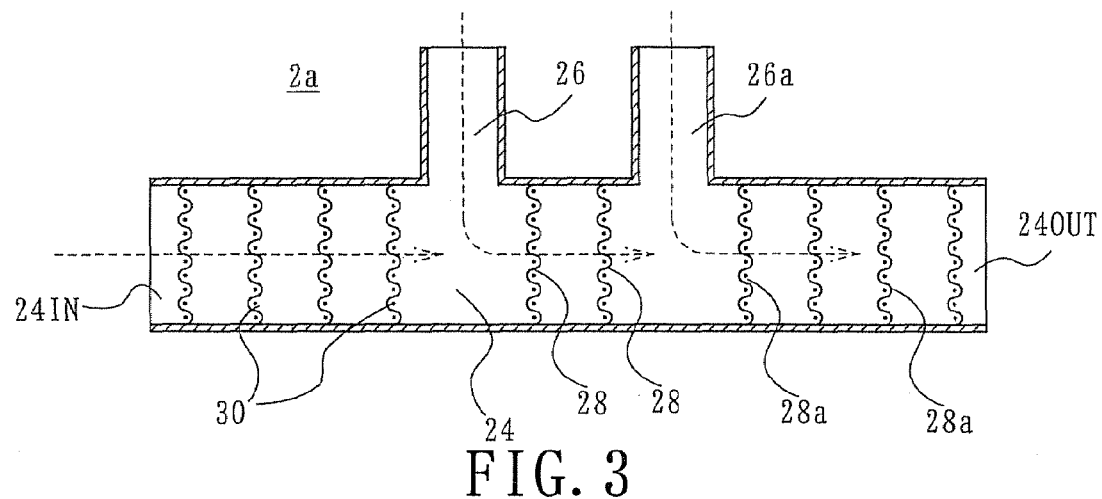
FIG. 3 shows a general construction of a mixer according to a second embodiment of the present invention.

A mixer 2a according to a second embodiment of the invention includes a second gaseous fuel path 26a, in addition to the gaseous fuel path 26, is coupled to the path 24 at a location between the gaseous fuel path 26 and the outlet port 24OUT, as shown in FIG. 3. Further, plural, e.g. four, addition nets 28 are spaced along the length direction of the path 24 in an area of the path 24 between the location where the second gaseous fuel path 26a is coupled to the path 24 and the outlet port 24OUT. As in the case of the mixer 2 of the first embodiment, hydrogen gas is supplied to the path 26, and a different gas, e.g. natural gas, is supplied from a natural gas source (not shown) to the second gaseous fuel path 26a. A third on-off valve (not shown) is disposed at a location between the natural gas source and the mixer 2a. The remaining configuration is the same as the mixer 2 of the first embodiment shown in FIG. 2. The same reference numerals as used in FIG. 2 are used for the same or equivalent components, and no further description about them is made.

With the first on-off valve closed to prevent the mixture gas consisting of gasoline and air from being supplied from the carburetor 16 to the mixer 2a, with the second on-off valve disposed between the hydrogen gas source 27 and the mixer 2a closed, and with the third on-off valve disposed between the natural gas source and the mixer 2a closed, the engine 4 is started so that the inlet valve 12 is opened. Then, hydrogen gas and natural gas are introduced through the gaseous fuel paths 26 and 26a, respectively, into the path 24. Also, air is introduced through the inlet port 24IN into the path 24 and flows through the nets 30, 28 and 28a toward the outlet port 24OUT. The hydrogen gas and the natural gas introduced into the path 24 also flow through the nets 28 and 28a toward the outlet port 24OUT. During the passage through the nets, the hydrogen gas, the natural gas and the air in the path 24 are mixed well, and the resultant mixture gas is sucked into the engine 4. If the engine 4 backfires, flames will jet out through the inlet valve 12 into the path 24, and the flames will contact the nets 28a, 28 and 30 in the path 24, so that the flames can be extinguished. Further, the nets 30 in the portion near the inlet port 24IN prevent the flames from going out through the inlet port 24IN to the carburetor 16. According to this embodiment, a mixture gas consisting of hydrogen gas and natural gas is supplied to the engine 4, and, accordingly, large power can be derived. The minimum required number of nets for each of the sets of the nets 28, 28a and 30 is one. That is, one net 28, one net 28a and one net 30 may provide satisfactory result. Furthermore, in some cases, the nets 28 and 30 can be eliminated, if necessary.

Figure 4:
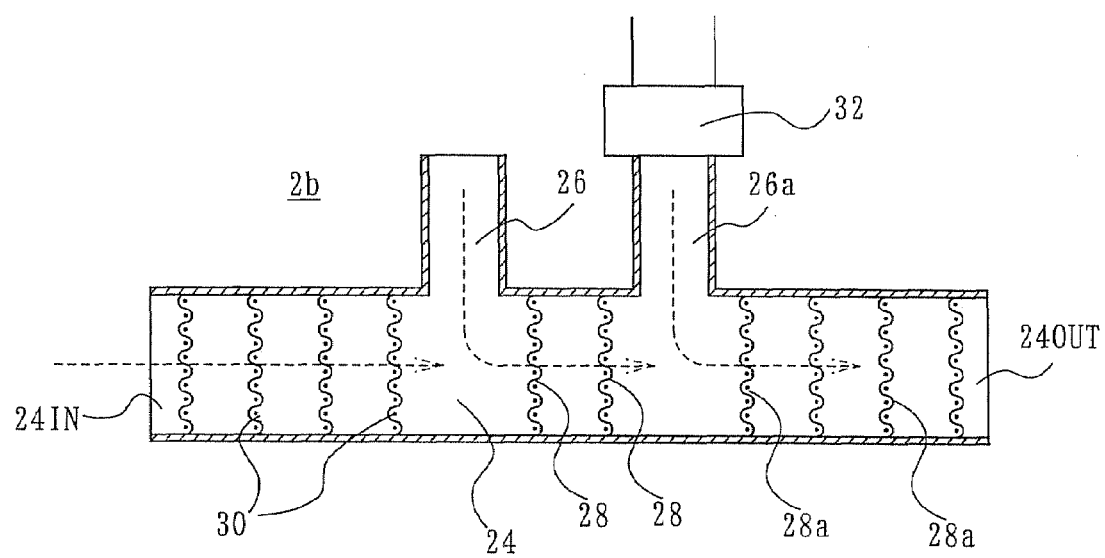
FIG. 4 shows a general construction of a mixer according to a third embodiment of the present invention.

FIG. 4 shows a mixer 2b according to a third embodiment of the present invention. The mixer 2b has the same configuration as the mixer 2a shown in FIG. 3, except that a second carburetor 32 is disposed in the fuel path 26a, through which, in place of natural gas, a liquid fuel, for example, a gasified liquid fuel consisting of gasified ethanol, is supplied to the path 24. The same reference numerals and symbols as used in FIG. 3 are used for the same or equivalent components of the mixer 2b, and no further detailed description about them is given. The mixer 2b of the third embodiment operates in a way similar to that of the mixer 2a of the second embodiment. The mixer 2b can be modified in the same way as the mixer 2a.

In place of a liquid fuel, a liquid, e.g. water and ammonia, which can function as a source of combustion promoting gas, may be supplied to the carburetor 32, whereby the combustion promoting gas is mixed with the gaseous fuel and air in the path 24. Water or ammonia mixed and combusted with the hydrogen gas can suppress production of nitrogen oxides.

Figure 5:
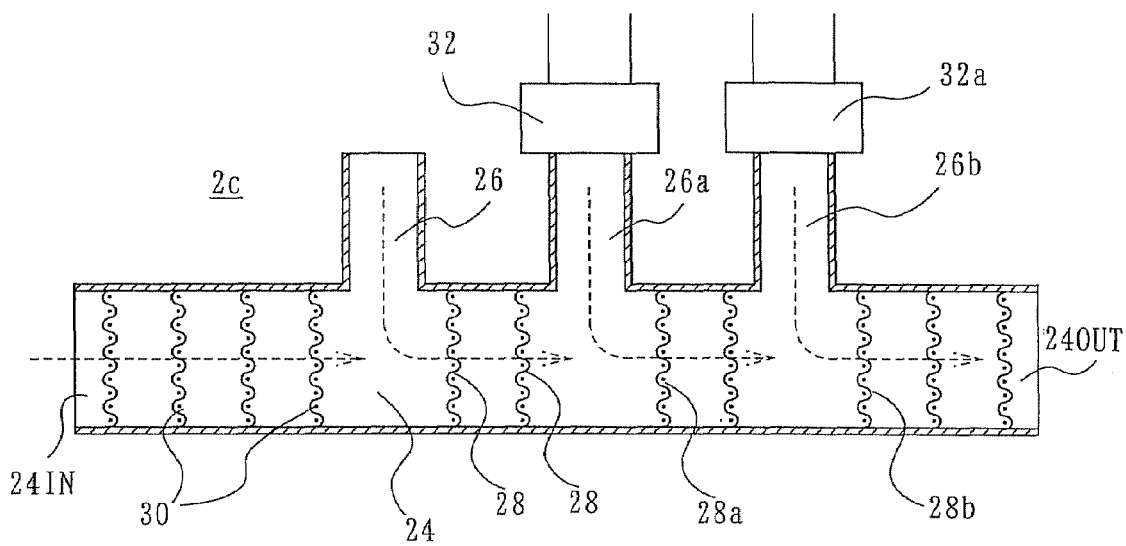
FIG. 5 shows a general construction of a mixer according to a fourth embodiment of the present invention.

FIG. 5 shows a mixer 2c according to a fourth embodiment of the present invention. The mixer 2c has the same configuration as the mixer 2b of the third embodiment, except that a third gaseous fuel path 26b is additionally provided, with additional nets 28b mounted in an area of the path 24 between the gaseous fuel path 26b and the outlet port 24OUT in the same manner as the nets 28 and 28a. A third carburetor 32a is mounted in the gaseous fuel path 26b. A liquid fuel, e.g. ethanol, is supplied to the carburetor 32, and a combustion promoting gas source, e.g. water or ammonia, is supplied to the third carburetor 32a. The same reference numerals as used for the mixer 2b of the third embodiment for the same or equivalent components of the mixer 2c, and their detailed description is not made. With the described arrangement of the mixer 2c, the gaseous fuel, the liquidized gaseous fuel and the combustion promoting gas are mixed with external air before being supplied to the engine 4, so that large power can be derived, with production of nitrogen oxides suppressed. In the mixer 2c of this embodiment, too, only one net 28, one net 28a, one net 28b and one net 30 can provide more or less satisfactory effect. In some cases, the nets 28a, 28 and 30 can be eliminated, if necessary.

In place of gasoline, crude petroleum or kerosene may be used. In the above-described embodiments, as the gaseous fuel to be mixed with external air, hydrogen gas having a smaller specific gravity than air is used, but propane having a larger specific gravity than air may be used instead. The engine with which the mixer of the present invention is used has been described as a single-cylinder engine, but it may be a multiple-cylinder engine. The engine 4 with which the mixer 2 of the present invention is used has been described as a reciprocating engine, but it may be an engine with pistons, such as a rotary engine. The mixer 2c according to the fourth embodiment may be further modified by adding a fourth gas path and one or more additional nets, and a gaseous fuel different from the gaseous fuel used in the mixer 2c may be additionally mixed for supplying to the engine 4. Furthermore, the positions of the gaseous fuel paths 26a and 26 in the mixers 2a and 2b according to the second and third embodiments may be exchanged so that the gaseous fuel path 26a is located nearer to the inlet port 24IN, with the gaseous fuel path 26 located nearer to the outlet port 24OUT. Similarly, in the mixer 2c according to the fourth embodiment, in which the gaseous fuel paths 26, 26a and 26b are arranged in the named order from the inlet port 24IN side to the outlet port 24OUT side, but the order may be arbitrarily changed. For example, the path 26a may be closest to the inlet port 24IN, the path 26b may be closest to the outlet port 24OUT, and the path 26 may be at a location intermediate between the paths 26a and 26b.

What is claimed is:

1. A mixer comprising:
    a path formed in an intake tube for supplying at least external air to an engine having a piston, said external air flowing from an inlet port to outlet port of said path;
    a gaseous fuel path coupled to an intermediate location of said path for supplying a gaseous fuel to said path; and
    a first net disposed in an area of said path between said outlet port and a location on said path where said gaseous fuel path is connected to said path:
    said first net being disposed in such a manner that an outer peripheral surface thereof is in contact with an inner peripheral surface of said path:
    wherein a second net is disposed in an area of said path between said inlet port and a location on said path where said gaseous fuel path is connected to said path, said second net being disposed in such a manner that an outer peripheral surface thereof is in contact with an inner peripheral surface of said path.

2. The mixer according to claim 1 wherein a plurality of said second nets are disposed, being spaced from each other along the length of said path.

3. A mixer comprising:
- a path formed in an intake tube for supplying at least external air to an engine having a piston, said external air flowing from an inlet port to outlet port of said path;
- a plurality of gaseous fuel paths coupled to said path to communicate with said path, said plurality of gaseous fuel paths being spaced along the length of said path; and
- a net disposed in an area of said path between said outlet port and the gaseous fuel path disposed closest to said outlet port, said net being disposed in such a manner that an outer peripheral surface thereof is in contact with an inner peripheral surface of said path;

wherein:
- a gaseous fuel is supplied to said respective gaseous fuel paths; or
- a gaseous fuel is supplied to one or more of said gaseous fuel paths, with a gasified liquid fuel supplied to the remaining gaseous fuel paths; or
- a gaseous fuel is supplied to one or more of said gaseous fuel paths with a combustion promoting gas supplied to the remaining ones of said gaseous fuel paths; or
- a gaseous fuel is supplied to one or more of said gaseous fuel paths, with a gasified liquid fuel supplied to other one or more of said gaseous fuel paths and with a combustion promoting gas supplied to the remaining ones of said gaseous fuel paths.

4. The mixer according to claim 3, wherein a plurality of said nets are disposed.

5. The mixer according to claim 3, wherein another net is disposed in an area of said path between said inlet port end a location on said path where the gaseous fuel path closest to said inlet port is connected to said path, said another net being disposed in such a manner tat an outer peripheral surface thereof is in contact with an inner peripheral surface of said path.

6. The mixer according to claim 3, wherein an additional net is disposed between adjacent ones of said gaseous fuel paths.

7. The mixer according to claim 1, wherein a carburetor is disposed in said intake tube for gasifying a liquid fuel, and said carburetor and said mixer are selectively operated.

8. The mixer according to claim 3, wherein a carburetor is disposed in said intake tube for gasifying a liquid fuel, and said carburetor and said mixer are selectively operated.

* * * * *

UNITED STATES PATENT AND TRADEMARK OFFICE
CERTIFICATE OF CORRECTION

PATENT NO. : 7,418,954 B2  Page 1 of 1
APPLICATION NO. : 11/612097
DATED : September 2, 2008
INVENTOR(S) : Yoshiro Iwai It is certified that error appears in the above-identified patent and that said Letters Patent is hereby corrected as shown below:

Column 8, claim 5, line 9, change "end" to --and--.
Column 8, claim 5, line 12, change "tat" to --that--.

Signed and Sealed this

Twenty-first Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,418,954 B2  
APPLICATION NO. : 11/612097  
DATED : September 2, 2008  
INVENTOR(S) : Yoshiro Iwai Page 1 of 1

It is certified that error appears in the above-identified patent and that said Letters Patent is hereby corrected as shown below:

Column 8, claim 5, line 9, change "end" to --and--.  
Column 8, claim 5, line 12, change "tat" to --that--.

Signed and Sealed this

Fourth Day of November, 2008

JON W. DUDAS  
*Director of the United States Patent and Trademark Office*

UNITED STATES PATENT AND TRADEMARK OFFICE
CERTIFICATE OF CORRECTION

PATENT NO.       : 7,418,954 B2
APPLICATION NO.  : 11/612097
DATED            : September 2, 2008
INVENTOR(S)      : Yoshiro Iwai It is certified that error appears in the above-identified patent and that said Letters Patent is hereby corrected as shown below:

This certificate vacates the Certificate of Correction issued November 4, 2008. The certificates is a duplicate of the Certificate of Correction issued October 21, 2008. All requested changes were included in the Certificate of Correction issued October 21, 2008.

Signed and Sealed this

Twenty-fifth Day of November, 2008

JON W. DUDAS
*Director of the United States Patent and Trademark Office*